United States Patent
Lou et al.

(10) Patent No.: US 9,472,225 B2
(45) Date of Patent: Oct. 18, 2016

(54) HEAT-ASSISTED MAGNETIC RECORDING HEAD-DISK CLEARANCE SETTING

(71) Applicant: Seagate Technology LLC, Cupertino, CA (US)

(72) Inventors: Huazhou Lou, Eden Prairie, MN (US); Jason Riddering, Prior Lake, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/619,795

(22) Filed: Feb. 11, 2015

(65) Prior Publication Data

US 2016/0232930 A1 Aug. 11, 2016

(51) Int. Cl.
*G11B 5/60* (2006.01)
*G11B 5/00* (2006.01)

(52) U.S. Cl.
CPC ............ *G11B 5/607* (2013.01); *G11B 5/6088* (2013.01); *G11B 5/6029* (2013.01); *G11B 5/6076* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,396,783 B1 | 5/2002 | Bell, Jr. et al. | |
| 7,616,398 B2* | 11/2009 | Gong | G11B 5/4555 360/75 |
| 7,990,647 B2* | 8/2011 | Lille | G11B 5/314 360/75 |
| 8,416,650 B2* | 4/2013 | Mori | G11B 5/3133 360/31 |
| 8,638,349 B1 | 1/2014 | Liu et al. | |
| 8,654,618 B1 | 2/2014 | Liu et al. | |
| 8,743,667 B1* | 6/2014 | Brockie | G11B 5/607 369/13.33 |
| 8,760,779 B2 | 6/2014 | Johns et al. | |
| 8,787,125 B1* | 7/2014 | Lee | G11B 5/6011 369/13.26 |
| 8,804,272 B1 | 8/2014 | Dakroub et al. | |
| 8,804,273 B1 | 8/2014 | Camalig et al. | |
| 8,837,070 B1 | 9/2014 | Johnson et al. | |
| 8,837,071 B2 | 9/2014 | Macken et al. | |
| 8,867,323 B2* | 10/2014 | Andruet | G11B 17/32 369/112.27 |
| 8,873,350 B2* | 10/2014 | Rausch | G11B 5/6088 369/112.27 |
| 8,873,353 B1 | 10/2014 | Riddering | |
| 8,902,718 B1* | 12/2014 | Ruan | G11B 5/607 369/13.11 |
| 8,922,929 B1* | 12/2014 | Ruan | G11B 5/607 360/75 |
| 8,937,853 B2* | 1/2015 | Zheng | G11B 5/607 369/13.26 |
| 9,019,646 B2* | 4/2015 | Rausch | G11B 13/04 360/294.7 |

(Continued)

OTHER PUBLICATIONS

International Search Report and Written Opinion dated Jul. 20, 2016 for PCT Application No. PCT/US2016/017241, 12 pages.

*Primary Examiner* — Wayne Young
*Assistant Examiner* — James L Habermehl
(74) *Attorney, Agent, or Firm* — Hollingsworth Davis, LLC (57) ABSTRACT

A magnetic recording head comprises a transducer, a heater, a writer and a laser. The transducer is configured to write to a magnetic recording medium during a write operation. The heater, writer and laser are configured to affect a protrusion of the transducer. The heater is calibrated to produce a pre-write heater power to obtain a target pre-write clearance for a write operation through use of a clearance-heater power curve. The curve is generated by measuring a clearance between the transducer and the medium as the heater is cycled from zero to a contact power.

20 Claims, 5 Drawing Sheets

(56) References Cited

U.S. PATENT DOCUMENTS

| | | | |
|---|---|---|---|
| 9,030,773 B2* | 5/2015 | Macken | G11B 5/314 360/75 |
| 2006/0139789 A1 | 6/2006 | Yang | |
| 2008/0072692 A1 | 3/2008 | Uji et al. | |
| 2009/0268330 A1 | 10/2009 | Lee et al. | |
| 2013/0091695 A1* | 4/2013 | Shimazawa | B82Y 20/00 29/601 |
| 2013/0286802 A1 | 10/2013 | Kiely | |
| 2013/0286805 A1 | 10/2013 | Macken et al. | |
| 2013/0286807 A1 | 10/2013 | Gao et al. | |
| 2014/0009851 A1 | 1/2014 | Budde | |
| 2014/0023108 A1 | 1/2014 | Johnson et al. | |
| 2014/0029396 A1* | 1/2014 | Rausch | G11B 13/04 369/13.23 |
| 2014/0269238 A1* | 9/2014 | Kautzky | G11B 5/3133 369/13.33 |
| 2014/0269819 A1 | 9/2014 | Kiely et al. | |
| 2014/0334275 A1 | 11/2014 | Zheng et al. | |
| 2015/0003219 A1* | 1/2015 | Isokawa | G11B 5/314 369/13.17 |
| 2015/0003223 A1* | 1/2015 | Macken | G11B 5/314 369/13.33 |
| 2015/0109892 A1 | 4/2015 | Contreras et al. | |

\* cited by examiner

HEAT-ASSISTED MAGNETIC RECORDING HEAD-DISK CLEARANCE SETTING

SUMMARY

A magnetic recording head of the present disclosure comprises a transducer, a heater, a writer and a laser. The transducer is configured to write to a magnetic recording medium during a write operation. The heater, writer and laser are configured to affect a protrusion of the transducer. The heater is calibrated to produce a pre-write heater power to obtain a target pre-write clearance for a write operation through use of a clearance-heater power curve. The curve is generated by measuring a clearance between the transducer and the medium as the heater is increased from zero to a contact power.

A magnetic recording head of the present disclosure comprises a transducer, a heater, a writer and a laser. The transducer is configured to write to a magnetic recording medium during a write operation. The heater, writer and laser are configured to affect a protrusion of the transducer. The heater is calibrated to produce a pre-write heater power to obtain a target pre-write clearance for a write operation through use of a first clearance-heater power curve. The first curve is generated by measuring a clearance between the transducer and the medium as the heater is increased from zero to a first contact power. The heater is additionally calibrated to produce a write heater power to obtain a target write clearance for a write operation through use of a second clearance-heater power curve. The second curve is generated by measuring a clearance between the transducer and the medium as the heater is increased from zero to a second contact power. The first curve is different from the second curve.

A method of the present disclosure comprises establishing a pre-write clearance between a protrusion of a transducer of a magnetic recording head and a recording medium. The protrusion is affected by a heater, writer and laser of the recording head. The pre-write clearance is established by measuring a first clearance between the transducer and the medium while increasing the heater power from a zero to a first contact heater power, generating a first clearance-heater power curve from the measured first clearances, and determining from the first clearance-heater power curve a pre-write heater to produce a target pre-write clearance.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to detection and control of head-media spacing in data storage devices. The detection of head-to-media spacing becomes more challenging in what are referred to as heat-assisted magnetic recording (HAMR) devices. This technology, also referred to as energy-assisted magnetic recording (EAMR), thermally-assisted magnetic recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to data errors.

Generally, HAMR recording heads may utilize heaters for fine control of head-to media spacing. The heaters heat a portion of the recording head that faces the recording medium. The heating causes a local protrusion due to thermal expansion of the material. Thermal protrusion can be finely controlled to maintain a desired clearance between read/write transducers and the recording medium. In HAMR, a number of other components near the read and write transducers may contribute to thermal protrusion. This can make the estimation and control of head-to-media spacing more difficult in a HAMR recording head.

Figure 1:
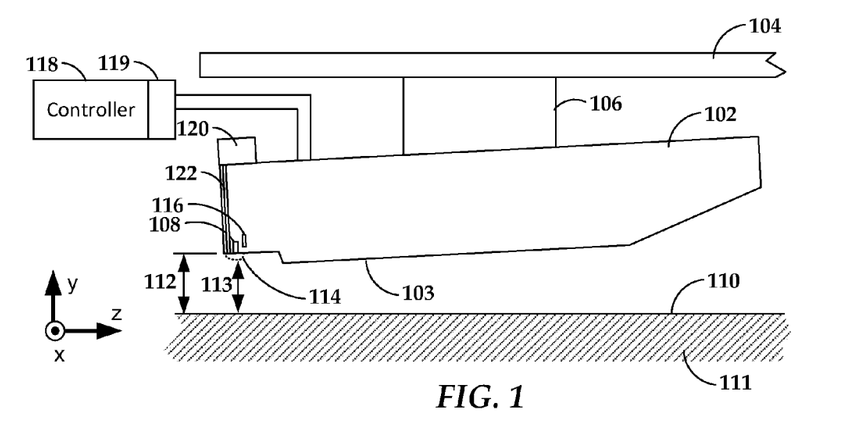
FIG. 1 is a block diagram of a heat-assisted magnetic recording (HAMR) head and media arrangement according to an example embodiment.

In reference now to FIG. 1, a block diagram shows a side view of a recording head 102 according to an example embodiment. The recording head 102 may also be referred to herein as a slider, read head, read/write head, head, etc. The recording head 102 is coupled to an arm 104 by way of a suspension 106 that allows some relative motion between the recording head 102 and arm 104. The recording head 102 includes read/write transducers 108 at a trailing edge that are held proximate to a surface 110 of a magnetic recording medium 111, e.g., magnetic disk. When the recording head 102 is located over surface 110 of recording medium 111, a flying height 112 is maintained between the recording head 102 and the surface 110 by a downward force of arm 104. This downward force is counterbalanced by an air cushion that exists between the surface 110 and an air bearing surface (ABS) 103 (also referred to herein as a "media-facing surface") of the recording head 102 when the recording medium 111 is rotating.

It is desirable to maintain a predetermined slider flying height 112 over a range of disk rotational speeds during both reading and writing operations to ensure consistent performance. Region 114 is a "close point" of the recording head 102, which is generally understood to be the closest point of contact between the read/write transducers 108 and the magnetic recording medium 111, and generally defines the head-to-media spacing 113. To account for both static and dynamic variations that may affect slider flying height 112, the recording head 102 may be configured such that a region 114 of the recording head 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114.

To provide this type of control over dynamic/effective head-to-media spacing 113 via heat, the recording head 102 may include (or otherwise be thermally coupled to) one or more heating elements 116. These heating elements 116 (e.g., resistance heaters) may be provided with selectable amounts of current by a controller 118. Generally, the controller 118 at least includes logic circuitry for controlling the functions of an apparatus that includes at least the recording head 102 and recording medium 111, and may include other components not shown, such as spindle motor, arm actuator, power supplies, etc. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the recording head 102 and other components not shown.

Other elements of the recording head 102 may also provide heat besides or in addition to the heating element 116. For example, a write coil of the read/write transducers 108 may generate sufficient heat to cause configurable deformation of region 114. This deformation will only occur when the coil is energized, e.g., when data is being written. Further, additional components within or near the HAMR recording head may generate heat near the read/write transducer 108. These heat-generating components include laser 120 (or other energy source) and waveguide 122. The waveguide 122 delivers light from the laser 120 to components near the read/write transducers 108. These components are shown in greater detail in FIG. 2.

Figure 2:
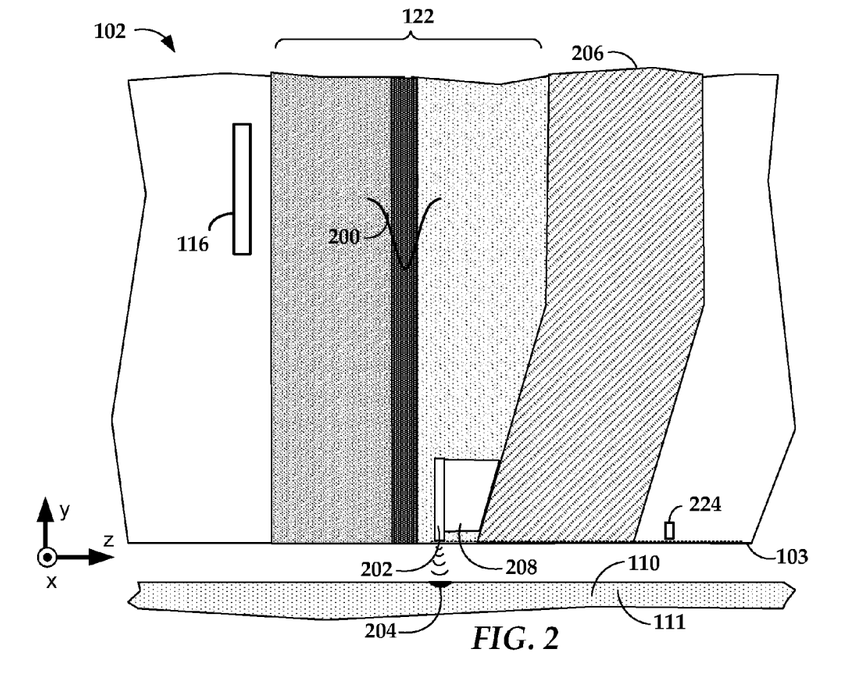
FIG. 2 is a cross-sectional view of a HAMR head according to an example embodiment.

In FIG. 2, a block diagram illustrates a cross-sectional view of the read/write head 102 according to an example embodiment. The waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The recording head 102 additionally includes the heating element (heater) 116 that may be used to adjust the protrusion of the NFT 202, a read transducer (not shown) and a sensor 224. The sensor 224 may be used for various purposes as will be described further below and, in the instance of the present disclosure, may be a temperature coefficient of resistance (TCR) type sensor, for example, a dual-ended TCR (DETCR). The recording head 102 further includes a heat sink 208 that is thermally coupled to the NFT 202; the heat sink 208 may be used to draw heat away, e.g., to the write pole 206 or other nearby heat-conductive components, as the heat at the hotspot 204 increases.

Figure 3:
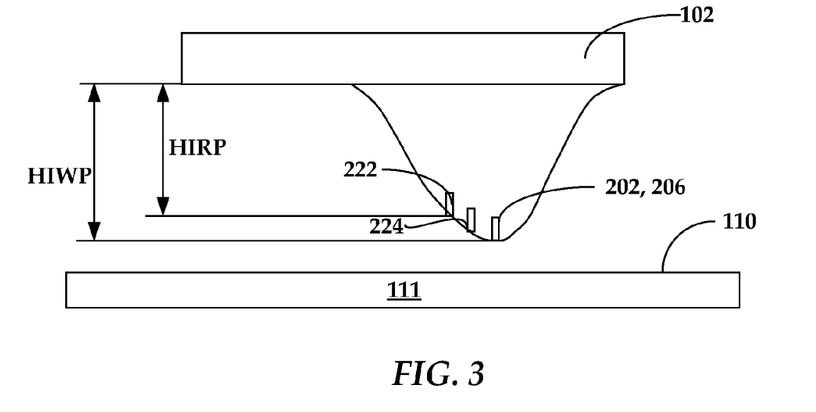
FIG. 3 is a block diagram illustrating protrusion of a HAMR recording head according to an example embodiment.
Figure 4:
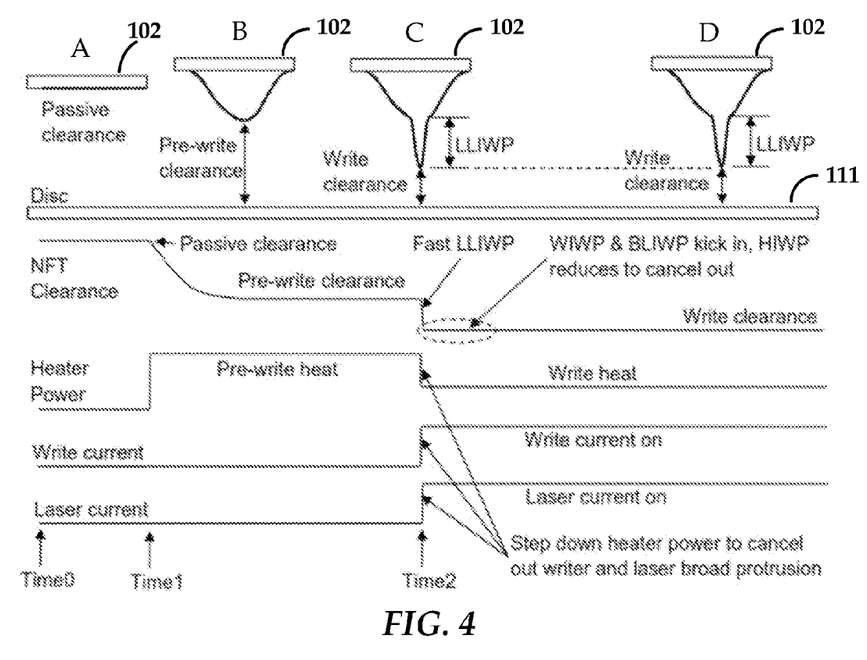
FIG. 4 is a block diagram illustrating passive, pre-write and write clearance between a disk and a HAMR recording head according to an example embodiment.

As shown in FIG. 3, as the temperature within the recording head 102 increases the area of the head 102 containing, for example, the NFT 202 and write pole 206, reader 222 and the sensor 224, protrudes towards the surface 110 of the medium 111. FIG. 4 illustrates the variations in protrusion and in clearance of the head 102 from the medium 111 as the head 102 is prepared for and executes a writing operation. The HAMR recording head will be protruded by the heater (HIWP—heater induced writer protrusion), the writer (WIWP—writer induced writer protrusion) and the laser (LIWP—laser induced writer protrusion). The combined protrusion of HIWP+WIWP+LIWP will place the NFT of the head at the target write clearance.

It should be noted that in HAMR, laser induced writer protrusion (LIWP) can be decomposed into two components: (1) local laser induced writer protrusion (LLIWP) and broad laser induced writer protrusion (BLIWP). The LLIWP is narrow in shape and has a very short time constant while the BLIWP is broad in shape and has a long time constant, similar to the heater and writer current induced protrusions. Thus, the target pre-write clearance=target write clearance−LLIWP.

Clearance Progression

If the target pre-write and write clearances have been established, the method for each of which is described in detail in the paragraphs below, the HAMR head will operate under the clearance progression illustrated in FIG. 4. As shown, the clearance between head 102 and medium 111 moves from the head 102 at a passive clearance stage A (before pre-write heat is applied), to a pre-write clearance stage B (pre-write heat has been applied), to a write clearance stage C (when heater, writer and laser heat is applied), and a write clearance stage D (steady-state write is occurring). As the head 102 moves through the clearance progression, it operates in accordance with the timing diagram of FIG. 4.

At time 0, the heater is off and the head is flying at the passive clearance. At time 1, at three times the heater constant to five times the heater time constant ahead of writing, the heater is turned onto a pre-write heat power level. At this point, the head will protrude down to the target pre-write clearance adequately before the write starts. At time 2, the write operation starts with the write current and the laser is turned on. Within 1 to 2 μsec, the laser induced LLIWP will protrude the NFT from the target pre-write clearance down to the target write clearance. At time 2, the write current and the laser will also start to protrude the head with WIWP and BLIWP at a long time constant, e.g., —100 μsec. The heater power then steps from pre-write heat down to write heat to compensate for WIWP and BLIWP to maintain the target write clearance throughout the write process.

Figure 5:
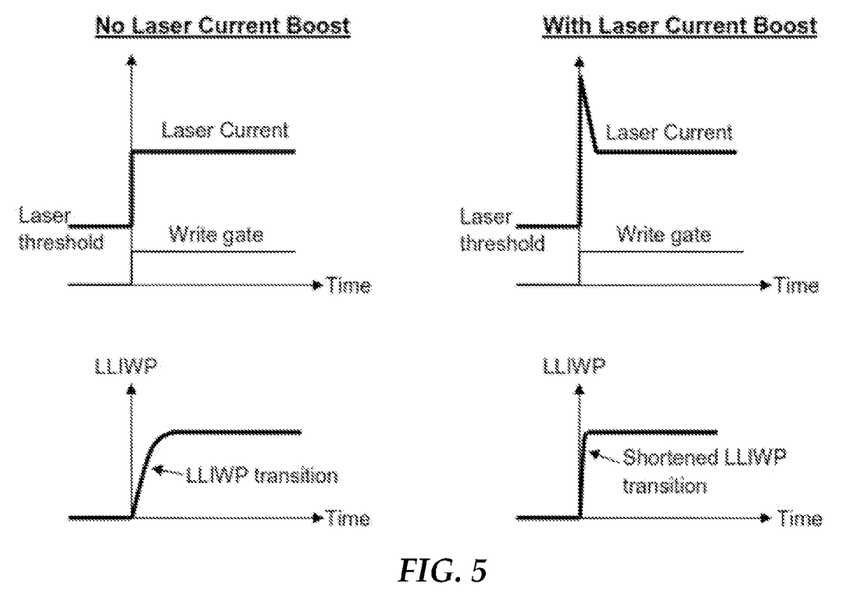
FIG. 5 provides comparison graphs illustrating the time required to achieve a write clearance protrusion with and without a current boost to the laser of the recording head according to an example embodiment.

Even though LLIWP (local laser induced write protrusion) occurs very fast, there may still be 1 to 2 μsec when the NFT clearance is in transition from the pre-write clearance to the write clearance. To shorten the transition time from pre-write to write clearance, a laser boost may be used to accelerate the NFT clearance from pre-write to write as shown in FIG. 5; the "laser threshold" noted in FIG. 5 is the safe laser current that will not erase any magnetic signal on the disk. Note that FIG. 5 provides a comparison of transition time between pre-write and write clearance without a laser boost, see the two leftmost graphs, and with a laser boost, see the two rightmost graphs.

Pre-Write Clearance and Pre-Write Heater Power

To determine the target pre-write clearance, contact detection using only the heat generated by the writer heater, is performed. Various methods of contact detection may be used which may, for example, include contact modulation (e.g., an AC circuit may be used to detect a jump in DETCR amplitude as determined from the AC portion of a sampled DETCR signal), contact frictional heating (e.g., a DC circuit may be used to detect a zero slope in the derivative of the DC DETCR signal/heater power), or other appropriate means. The writer heater heat-only contact detection establishes the zero clearance reference when the writer and laser are off and establishes the heater power required to achieve contact ("contact power"). This zero clearance reference may be used to establish the target pre-write clearance.

Figure 6:
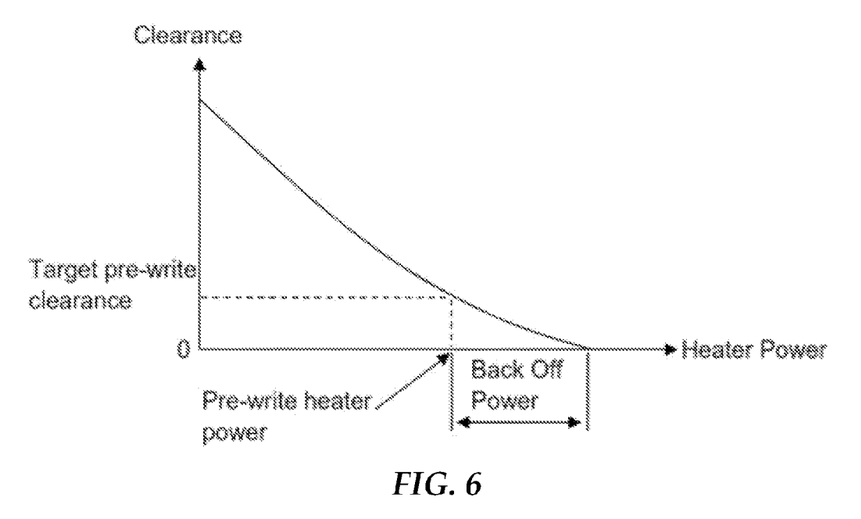
FIG. 6 is a clearance-heater power curve illustrating the heater power for pre-write clearance according to an example embodiment.

Knowing the heater contact power, heater-induced reader protrusion (HIRP) can be measured and calibrated using a read back signal and channel harmonic sensor varying the heater power up to the known heater contact power. A channel harmonic sensor comprises channel circuitry that can extract the amplitude of a single tone frequency from a noisy readback signal. This produces a HIRP versus heater power curve. The HIRP curve can then be scaled with a gamma factor to establish a heater induced writer protrusion (HIWP) versus heater power curve, where gamma=HIWP/HIRP). The HIWP curve translates to a clearance-heater power curve, as shown in FIG. 6, with the contact point of the curve on the clearance axis indicating passive clearance at zero power and the contact point of the curve on the heater power axis indicating zero clearance at the contact power.

Before writing, the HAMR recording head may be set to a pre-write clearance for a period of time to compensate for the protrusion time constant of the heater, writer, and laser, e.g. heat is applied allowing the head to protrude in a broad protrusion (see stage B of FIG. 4). With the target pre-write clearance established using contact detection, as described above and illustrated on FIG. 6 with the dashed line, the pre-write heater power may be calculated from the curve of FIG. 6. As shown, the pre-write heater power will be set at the contact power minus the back off power required to reach to the target pre-write clearance. The pre-write heater power may then be used by the HAMR head to obtain pre-write clearance during a write operation.

Figure 7:
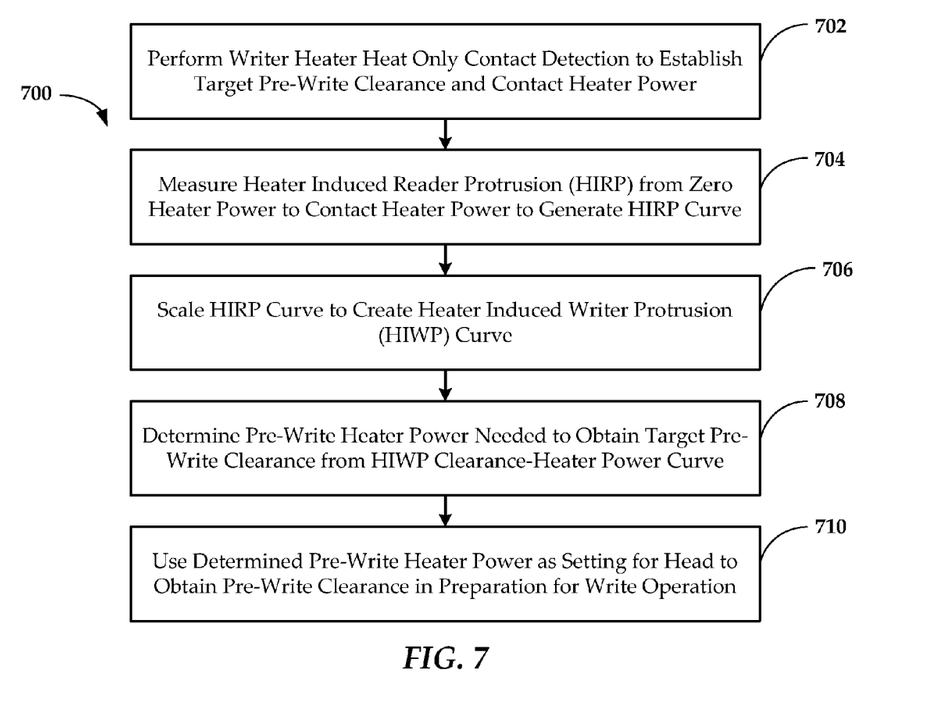
FIG. 7 is a flowchart of a method for establishing pre-write heater power and pre-write clearance according to an example embodiment.

FIG. 7 illustrates a method 700, according to an example embodiment, of determining the pre-write heater power to obtain pre-write clearance in preparation for a write operation. The method 700 includes performing a writer heater heat only contact detection to establish a pre-write clearance for a HAMR head and to establish contact heater power 702. The method further includes measuring the heater induced reader protrusion (HIRP) from zero heater power to contact here power to generate an HIRP curve 704. The HIRP curve is then scaled to create a heater induced writer protrusion HIWP curve 706 from which the pre-write heater power needed for target pre-write clearance may be determined 708. The determined pre-write heater power may then be used as a setting for the head to ensure pre-write clearance between the head and disk during a write operation 710.

Write Clearance and Write Heater Power

To set write clearance, a write zero clearance reference may be established through contact detection using "write plus heat" with or without the laser. During "write plus heat" contact detection, the write current will be established through a set of default write parameters which may, for example, include write steady-state current, overshoot amplitude, overshoot duration, frequency, and rise time. Further, the laser current may be off or at a default value. Contact detection may be performed using any appropriate method including those previously described with respect to pre-write clearance. The "write plus heat" contact detection establishes a zero clearance reference and also establishes the heater power required to achieve contact ("contact power"). This zero clearance reference may be used to establish the target write clearance.

Figure 8:
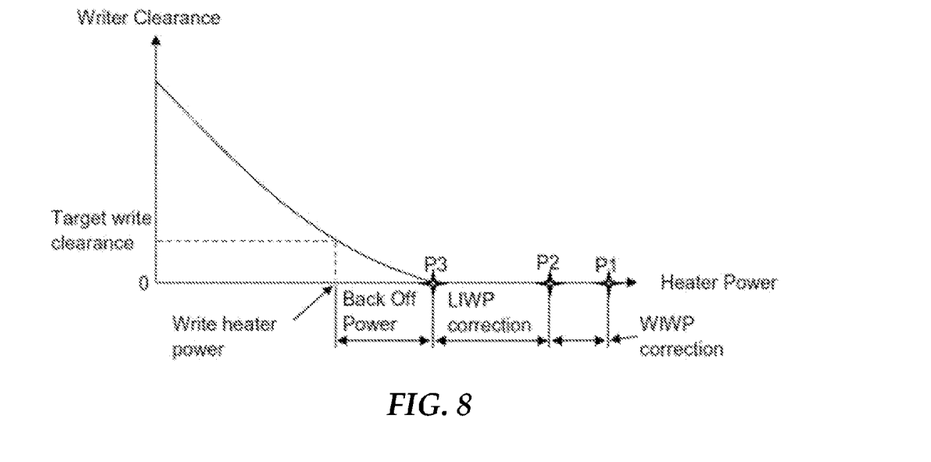
FIG. 8 a clearance-heater power curve illustrating the heater power for write clearance according to an example embodiment.

As shown by the writer clearance—heater power curve of FIG. 8, the "write plus heat" contact power occurs at point P1 on the heater power axis at zero clearance. When the head is operating at a different write current, P2 is the heater power for zero clearance after correcting for writer induced writer protrusion (WIWP). The correction for WIWP may be defined as:

$$\text{WIWP correction} = f(\Delta(\text{write steady-state current, overshoot amplitude, overshoot duration, frequency, rise time), track location}) \quad \text{Eq. (1)}$$

When the head is operating at still a different laser current (laser current and write current are present), P3 is the heater power for zero clearance after further correcting for any laser induced writer protrusion (LIWP) difference. The correction for LIWP may be defined as:

$$\text{LIWP correction} = f(\Delta(\text{laser current}), \text{track location}) \quad \text{Eq. (2)}$$

Knowing the heater power P3 for zero clearance, the writer-laser-heater induced write protrusion (WLHIWP) can be measured and calibrated using a read back signal and channel harmonic sensor varying the heater power from zero up to the known heater power P3. This produces the WLHIWP clearance-heater power curve shown in FIG. 8. As depicted, the contact point of the WLHIWP curve on the writer clearance axis indicates the head clearance at the parameters of zero heater power with both the laser current and the write current on. The contact point of the WLHIWP curve on the heater power axis indicates zero clearance with heater power at P3.

Knowing the target write clearance, obtained through contact detection as described above and indicated with a dashed line in FIG. 8, the WLHIWP curve may be used to determine the back off power to get the write heater power for achieving write target clearance, e.g., write heater power=P3–back off power. When the head is operating at the calibrated write heater power, the operating write current, and the operating laser current, the NFT will be set to the target write clearance.

Note that the WLHIWP curve is measured from zero heat to P3 minus a small back off to avoid burnish. A second order curve is fitted and the curve is extrapolated to P3. WLHIWP is measured off of a written 2T pattern signal. At each power level, while the reader is flying on the written 2T track, a long dummy write (e.g., longer than 10× the time constant of the heater) with the operating write current and laser current is performed. Immediately after the write, the 2T track amplitude is measured. The measured amplitude change with heater power is converted to clearance change with the Wallace spacing loss equation. A gamma scaling factor is applied to convert to clearance change at the writer.

Figure 9:
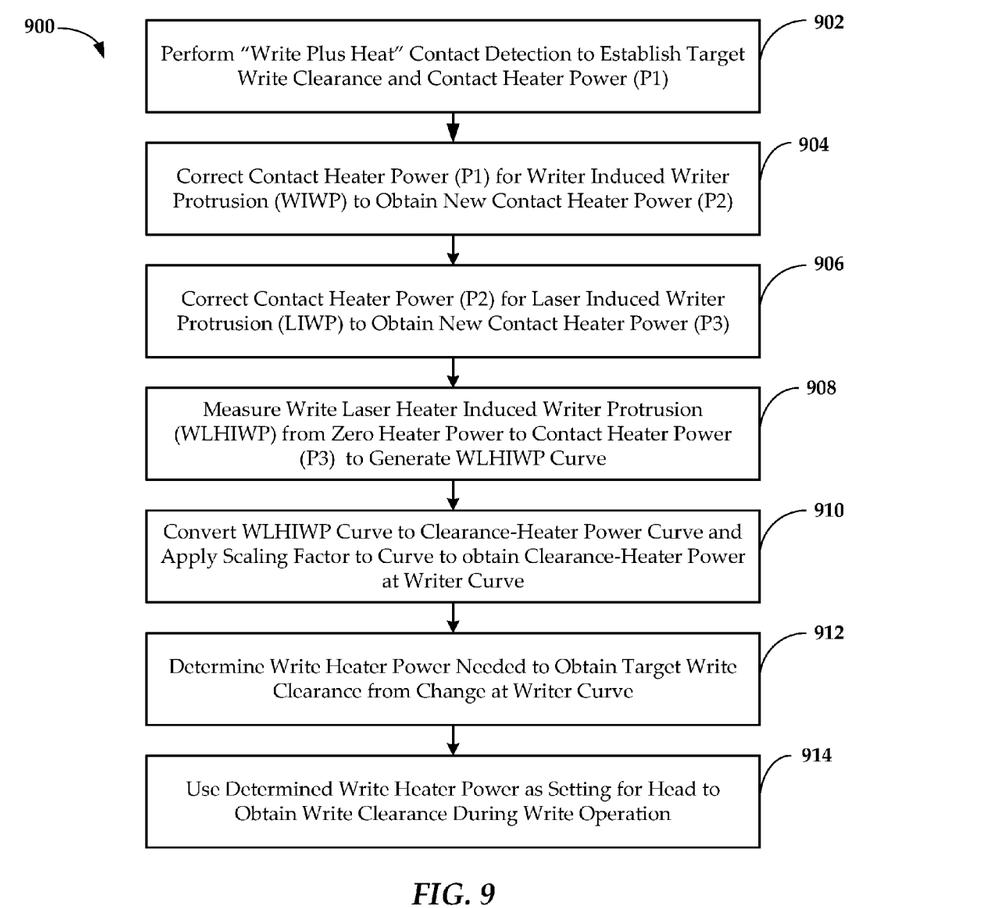
FIG. 9 is a flowchart of a method for establishing write heater power and write clearance according to an example embodiment.

FIG. 9 illustrates a method 900, according to an example embodiment, of determining the write heater power to obtain write clearance during a write operation. The method 900 includes performing a "write plus heat" contact detection procedure to establish a write clearance for the HAMR head and to establish a contact heater power (P1) 902. The contact heater power (P1) is then corrected for writer induced writer protrusion (WIWP) to obtain a new contact heater power (P2) 904. The contact heater power (P2) is then corrected for laser induced writer protrusion (LIWP) to obtain a new contact heater power (P3) 906. The write-laser-heater induced writer protrusion (WHLIWP) is then measured from zero heater power to contact heater power (P3) to generate a WLHIWP curve 908. The WLHIWP curve is then converted to a clearance-heater power curve to which a scaling factor is applied to obtain a clearance—heater power curve representing the clearance change at the writer 910. The write heater power needed to obtain the target write clearance is determined from the clearance change at the writer curve 912. The determined write heater power may then be used as a setting for the head to obtain write clearance during a write operation 914.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus comprising:
   interface circuitry configured to communicate with a magnetic recording head, the magnetic recording head comprising:
   a transducer configured to write to a magnetic recording medium during write operations; and
   a heater, a writer and a laser, wherein each of the heater, writer and laser are configured to affect a protrusion of the transducer; and
   logic circuitry coupled to the interface circuitry and configured to:
   apply a pre-write heater power to the heater before a write operation starts to obtain a target pre-write clearance for the write operation, the pre-write clearance compensating for a protrusion time constant of the heater, the writer, and the laser and is obtained through use of a clearance-heater power curve, wherein the curve is generated by measuring a clearance between the transducer and the medium as the heater is increased from zero power to a contact power; and
   apply a reduced write power to the heater after the write operation starts, the reduced write power compensating for protrusion of the laser and the writer during the write operation.

2. The apparatus of claim 1, wherein the target pre-write clearance falls on the clearance-heater power curve at a pre-write heater power that is less than the contact power.

3. The apparatus of claim 1, wherein the clearance is measured by a channel harmonic sensor.

4. The apparatus of claim 1, wherein clearance-heater power curve is based on a measured heater induced reader protrusion (HIRP) that is scaled by a gamma factor to obtain a write protrusion.

5. The apparatus of claim 1, wherein the contact power is determined through a writer heater heat only contact detection.

6. An apparatus comprising:
   interface circuitry configured to communicate with a magnetic recording head, the magnetic recording head comprising:
   a transducer configured to write to a magnetic recording medium during write operations; and
   a heater, a writer and a laser, wherein each of the heater, writer and laser are configured to affect a protrusion of the transducer; and
   logic circuitry coupled to the interface circuitry and configured to:
   apply a pre-write heater power to the heater before a write operation starts to obtain a target pre-write clearance for the write operation, the pre-write clearance compensating for a protrusion time constant of the heater, the writer, and the laser and is obtained through use of a first clearance-heater power curve, wherein the curve is generated by measuring a first clearance between the transducer and the medium as the heater is increased from zero power to a first contact power, and
   apply a write heater power to to obtain a target write clearance for the write operation through use of a second clearance-heater power curve, wherein the curve is generated by measuring a second clearance between the transducer and the medium as the heater is increased from zero power to a second contact power, wherein the second clearance-heater power curve is different from the first clearance heater power curve.

7. The apparatus of claim 6, wherein the first clearance-heater power curve is based on a measured heater induced reader protrusion (HIRP) that is scaled by a gamma factor to obtain a write protrusion.

8. The apparatus of claim 7, wherein the second clearance-heater power curve is based on a measured writer laser heater induced writer protrusion (WLHIWP).

9. The apparatus of claim 6, wherein the first contact power is determined through a writer heater heat only contact detection.

10. The apparatus of claim 9, wherein the second contact power is determined through a "write plus heat" contact detection.

11. The apparatus of claim 6, wherein the first and second clearance are measured by a channel harmonic sensor.

12. The apparatus of claim 6, wherein the target pre-write clearance falls on the first clearance-heater power curve at a pre-write heater power that is less than the first contact power.

13. The apparatus of claim 12, wherein the target write clearance falls on the second clearance-heater power curve at a write heater power that is less than the second contact power, wherein the second contact power has been adjusted to compensate for writer induced writer protrusion (WIWP) and laser induced writer protrusion (LIWP).

14. A method comprising:
   establishing a pre-write clearance between a protrusion of a transducer of a magnetic recording head and a recording medium, wherein the protrusion compensates for a protrusion time constant of a heater, writer and laser of the recording heard, the pre-write clearance established by:
   measuring a first clearance between the transducer and the medium while increasing the heater power from zero to a first contact heater power;
   generating a first clearance-heater power curve from the measured first clearances; and
   determining from the first clearance-heater power curve a pre-write heater power to produce a target pre-write clearance;
   applying a pre-write heater power to the heater before the write operation starts to obtain the target pre-write clearance; and
   applying a reduced write power to the heater after the write operation starts, the reduced write power compensating for a write protrusion of the laser and the writer during the write operation.

15. The method of claim 14, wherein the pre-write heater power is less than the first contact heater power.

16. The method of claim 14, wherein the first clearance-heater power curve is based on a measured heater induced reader protrusion (HIRP) that is scaled by a gamma factor to obtain the write protrusion.

17. The method of claim 14, wherein the first clearance is measured by a channel harmonic sensor.

18. The method of claim 14, further comprising:
   establishing a write clearance between a protrusion of the transducer and the medium by:
   measuring a second clearance between the transducer and the medium while increasing the heater power from zero to a second contact heater power;
   generating a second clearance-heater power curve from the measured second clearances; and
   determining from the second clearance-heater power curve a write heater power to produce a target write clearance.

19. The method of claim 18, wherein the second clearance-heater power curve is based on a measured writer laser heater induced writer protrusion (WLHIWP).

20. The method of claim 18, wherein the second contact heater power has been adjusted to compensate for writer induced writer protrusion (WIWP) and laser induced writer protrusion (LIWP).

* * * * *